April 21, 1936.     O. E. STIEHL ET AL     2,037,943
KNIFE WITH HANDLE CASING

Filed March 25, 1935

Patented Apr. 21, 1936

2,037,943

UNITED STATES PATENT OFFICE 2,037,943

KNIFE WITH HANDLE CASING

Otto Ernst Stiehl, Solingen, and Ernst Lohr, Jr., Solingen-Ohligs, Germany

Application March 25, 1935, Serial No. 12,856
In Germany July 21, 1934

4 Claims. (Cl. 30—10)

This invention relates to a knife with handle casings, for example a table knife, pocket knife or fixed bladed knife, and consists in that the handle casings are provided with a covering of natural or artificial leather of any desired color, this leather having, if desired, embossings or other markings, such as inscriptions, designs and the like.

This leather covering may be secured on the handle casings by stretching and sticking thereon, for which purpose the outer side of the handle casings may be roughened to facilitate the adhesion. This leather covering imparts to the knife an agreeable soft and warm grip and is very durable and relatively cheap. The leather covering may be provided with inscriptions, embossings, designs or the like so that a knife provided with such a leather covering can be employed for advertising purposes.

The leather covering may extend over the entire surface of the handle casing and the edges may be folded over the edges of the casings and secured by gluing or by clamping between the handle casings and the side plates or blade sheath.

The leather covering can also be stuck on, without being pulled and folded over the edges of the handle casing, on the outer side of the handle casings which are preferably roughened.

The handle casings may likewise be provided each one with a depression for accommodating the leather covering in such a manner that raised cheeks or caps remain on the ends of the casing. The edges of these cheeks or caps bent over towards the side plates of the knife are connected with the body of the knife by welding or soldering, thereby fixing the casings on the body of the knife.

Several embodiments of the invention are illustrated by way of example in the accompanying drawing in which:—

Figure 1:
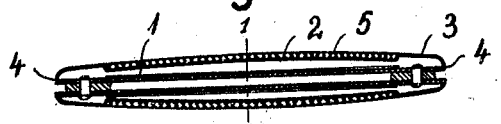
Fig. 1 is a longitudinal section of a pocket knife with recessed handle casings.
Figure 2:
Fig. 2 is a section on line 1—1 of Fig. 1.
Figure 3:
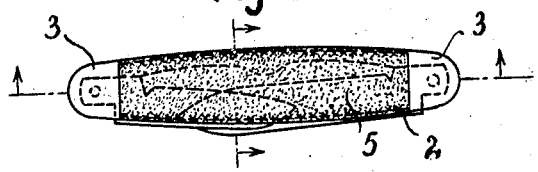
Fig. 3 is a top plan view of Fig. 1.

In Fig. 1 the knife body 1 is provided with handle casings each having a depression 2 and raised cheeks 3 one at each end. The edges of these cheeks bent over towards the knife body are connected with the knife body 1 at 4 by welding or soldering so that the handle casings in this manner are connected with and bear tightly against the knife body. A leather covering 5 is stretched in each depression and, as shown in Fig. 2, its edges 6 folded over the edges of the harder casing are clamped between the casing and knife body and hold the covering on the body. To prevent the covering from projecting beyond the longitudinal edges of the knife body the handle casings are narrower between the cheeks 3 by the thickness of the covering.

Figure 4:
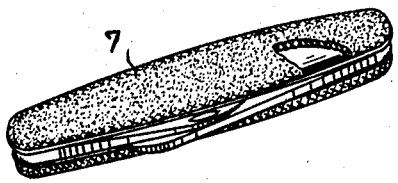
Fig. 4 shows in perspective view a pocket knife the handle casings of which are completely covered with a leather covering.

Fig. 4 shows a pocket knife the handle casings of which are each completely covered with a leather covering. This covering may be stuck to the surface of the handle casing which is preferably roughened, or affixed thereto by rivets connecting the handle casings with the knife body, the edges folded over the edges of the handle casings being preferably clamped between the knife body and the knife casings. The handle casings are made thinner by the thickness of the covering as otherwise the casings covered with the covering would project beyond the edges of the knife body.

Figure 5:
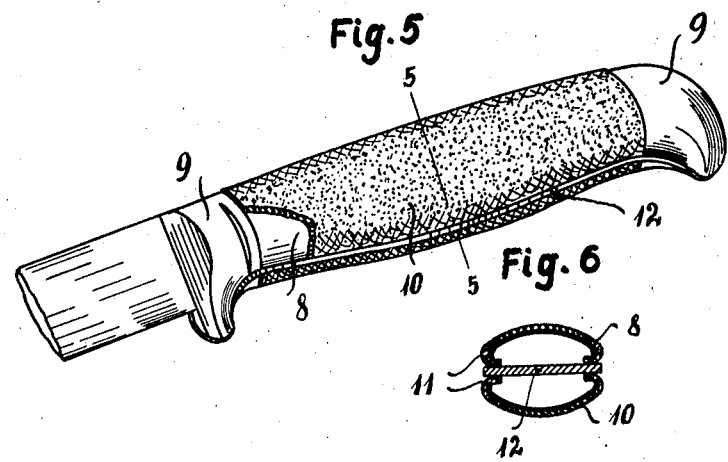
Fig. 5 is a perspective view of a fixed bladed knife the handle casings of which are covered with leather.
Figure 6:
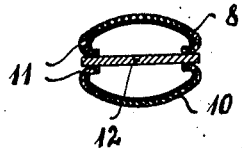
Fig. 6 is a section on line 5—5 of Fig. 5.

The knife illustrated in Fig. 5 has a fixed blade. In this instance the handle casings have each a leather covering 10 in their recessed portion 8 between the cheeks 9, the edges 11 of the covering being folded over along both longitudinal sides and clamped between the knife casing 8 and blade shank 12 as shown in Fig. 6.

The handle casings may each be provided with a covering of some other material, such as thin celluloid, instead of natural or artificial leather.

We claim:—

1. A knife handle, comprising in combination a handle body, hollow pressed side plates rigidly secured to said body, and a covering of a thin pliable material, such as leather folded over the edges of said plates and clamped between said plates and said body.

2. A knife handle as specified in claim 1, in which the side plates are narrower than the handle body to prevent the leather from projecting beyond the edges of the body.

3. A knife handle as specified in claim 1, in which the side plates have a recess in the middle for accommodating the covering and raised cheeks one at each end, these cheeks being rigidly connected to the body and the folded over edges of the covering being clamped between the inner edges of the plates and the outer side of the body.

4. A knife handle as specified in claim 1, in which the side plates have a recess in the middle for accommodating the covering and raised cheeks one at each end, these cheeks being rigidly connected to the body and the folded over edges of the covering being clamped between the inner edges of the plates and the outer side of the body, and the recessed portion between the cheeks being narrower than the body to prevent the leather covering from projecting beyond the edges of the cheeks.

OTTO ERNST STIEHL.
ERNST LOHR, JUNIOR.